US010162620B2

(12) United States Patent
Luk et al.

(10) Patent No.: US 10,162,620 B2
(45) Date of Patent: Dec. 25, 2018

(54) SYSTEMS AND METHODS FOR LOCATION-BASED APPLICATION INSTALLATION

(71) Applicant: PAYPAL, INC., San Jose, CA (US)

(72) Inventors: Bryant Genepang Luk, Austin, TX (US); Robert He, Austin, TX (US); Christopher Diebold O'Toole, Austin, TX (US); Yu Tang, San Jose, CA (US); Jennifer T. Brenner, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 14 days.

(21) Appl. No.: 15/214,300

(22) Filed: Jul. 19, 2016

(65) Prior Publication Data

US 2016/0328225 A1 Nov. 10, 2016

Related U.S. Application Data

(63) Continuation of application No. 14/300,136, filed on Jun. 9, 2014, now Pat. No. 9,411,572.

(51) Int. Cl.
| | |
|---|---|
| *G06F 9/445* | (2018.01) |
| *H04L 29/06* | (2006.01) |
| *H04W 4/02* | (2018.01) |
| *G06F 8/61* | (2018.01) |
| *H04W 4/60* | (2018.01) |
| *G06F 21/60* | (2013.01) |
| *H04L 29/08* | (2006.01) |
| *H04W 64/00* | (2009.01) |
| *H04W 88/02* | (2009.01) |

(52) U.S. Cl.
CPC .............. *G06F 8/61* (2013.01); *G06F 8/62* (2013.01); *G06F 21/60* (2013.01); *H04L 67/20* (2013.01); *H04L 67/42* (2013.01); *H04W 4/02* (2013.01); *H04W 4/60* (2018.02); *H04W 64/00* (2013.01); *H04W 88/02* (2013.01)

(58) Field of Classification Search
CPC .............. G06F 8/62; G06F 8/61; H04W 4/02
USPC ........................................................ 709/223
See application file for complete search history.

(56) References Cited

U.S. PATENT DOCUMENTS

| | | | |
|---|---|---|---|
| 6,347,398 B1 * | 2/2002 | Parthasarathy | ........... G06F 8/60 |
| | | | 707/999.202 |
| 6,646,595 B1 | 11/2003 | Heng et al. | |
| 6,802,061 B1 | 10/2004 | Parthasarathy et al. | |
| 7,062,261 B2 | 6/2006 | Goldstein et al. | |

(Continued)

*Primary Examiner* — John Q Chavis
(74) *Attorney, Agent, or Firm* — Haynes and Boone, LLP

(57) ABSTRACT

A system and/or method may be provided to install applications based on location. In particular, a location of a user device may be detected. Based on the location of the user device, one or more applications may be selected to be installed automatically on the user device. Further, when the user device departs from the location, the application may automatically be uninstalled. Thus, applications may be installed and/or uninstalled on the user device based on the location of the user device. The automatically installed application may provide functionality or information associated with the location that triggered the installation. For example, a merchant's store may be associated with the merchant's application which may be installed automatically on devices of customers who enter the merchant's store.

20 Claims, 4 Drawing Sheets

(56) References Cited

U.S. PATENT DOCUMENTS

| | | |
|---|---|---|
| 8,571,598 B2 | 10/2013 | Valavi |
| 8,947,239 B1 | 2/2015 | Park |
| 9,204,251 B1 | 12/2015 | Mendelson |
| 2006/0031830 A1 | 2/2006 | Chu et al. |
| 2006/0173618 A1 | 8/2006 | Eyer et al. |
| 2008/0045172 A1 | 2/2008 | Narayanaswami et al. |
| 2008/0070588 A1 | 3/2008 | Morin |
| 2009/0005077 A1* | 1/2009 | Forstall ............ H04M 1/72544 455/456.2 |
| 2013/0045729 A1* | 2/2013 | Haik ..................... H04W 4/02 455/418 |
| 2013/0102339 A1* | 4/2013 | Shiroshima .......... H04W 76/10 455/466 |
| 2013/0339498 A1* | 12/2013 | Johnson ................. H04W 4/02 709/221 |
| 2014/0108078 A1 | 4/2014 | Davis |
| 2014/0109080 A1* | 4/2014 | Ricci ........................ G06F 8/61 717/174 |
| 2014/0223020 A1* | 8/2014 | Hyman .............. H04L 65/1069 709/228 |
| 2014/0354453 A1* | 12/2014 | Fourie ................... G08G 1/144 340/932.2 |
| 2015/0181048 A1* | 6/2015 | Aebi ..................... G01S 5/0054 455/406 |
| 2015/0301821 A1* | 10/2015 | Danne ..................... G06F 8/665 717/169 |
| 2016/0029294 A1 | 1/2016 | Kim |
| 2016/0226297 A1* | 8/2016 | Ojala ................... H04W 4/008 |
| 2017/0004536 A1* | 1/2017 | Hyman .............. H04L 65/1069 |
| 2017/0214698 A1* | 7/2017 | Hughes ................ H04L 63/105 |

* cited by examiner

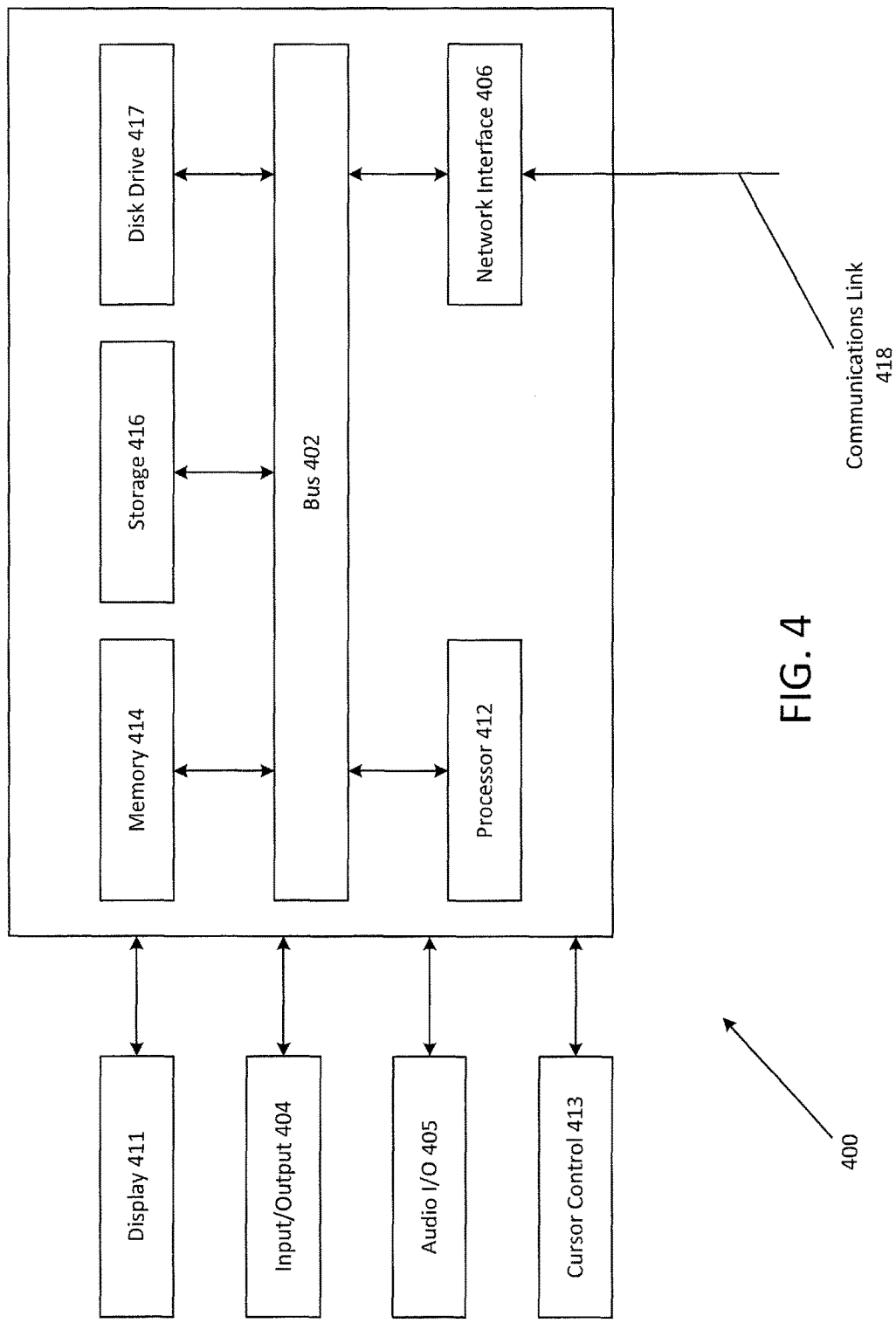

SYSTEMS AND METHODS FOR LOCATION-BASED APPLICATION INSTALLATION

CROSS REFERENCE TO RELATED APPLICATION

This application is a continuation of U.S. application Ser. No. 14/300,136, filed Jun. 9, 2014, which is hereby incorporated by reference in its entirety.

BACKGROUND

Technical Field

The present invention generally relates to systems and methods for location based application installation.

Related Art

With the increasing use of mobile devices and the improved networking and online capabilities of these mobile devices, various applications have been developed or created to provide additional functions and capabilities to these mobile devices. For example, a merchant may create an application that helps a customer with making purchases at the merchant. However, many applications are underutilized because users do not know about these applications or because users do not take time and/or effort to download and install these applications. Thus, there is a need for a system or method that helps select and/or install applications on mobile devices to provide greater utility for users.

BRIEF DESCRIPTION OF THE FIGURES

FIG. 4 is a block diagram of a computer system suitable for implementing one or more components in FIG. 1 according to one embodiment.

Figure 1:
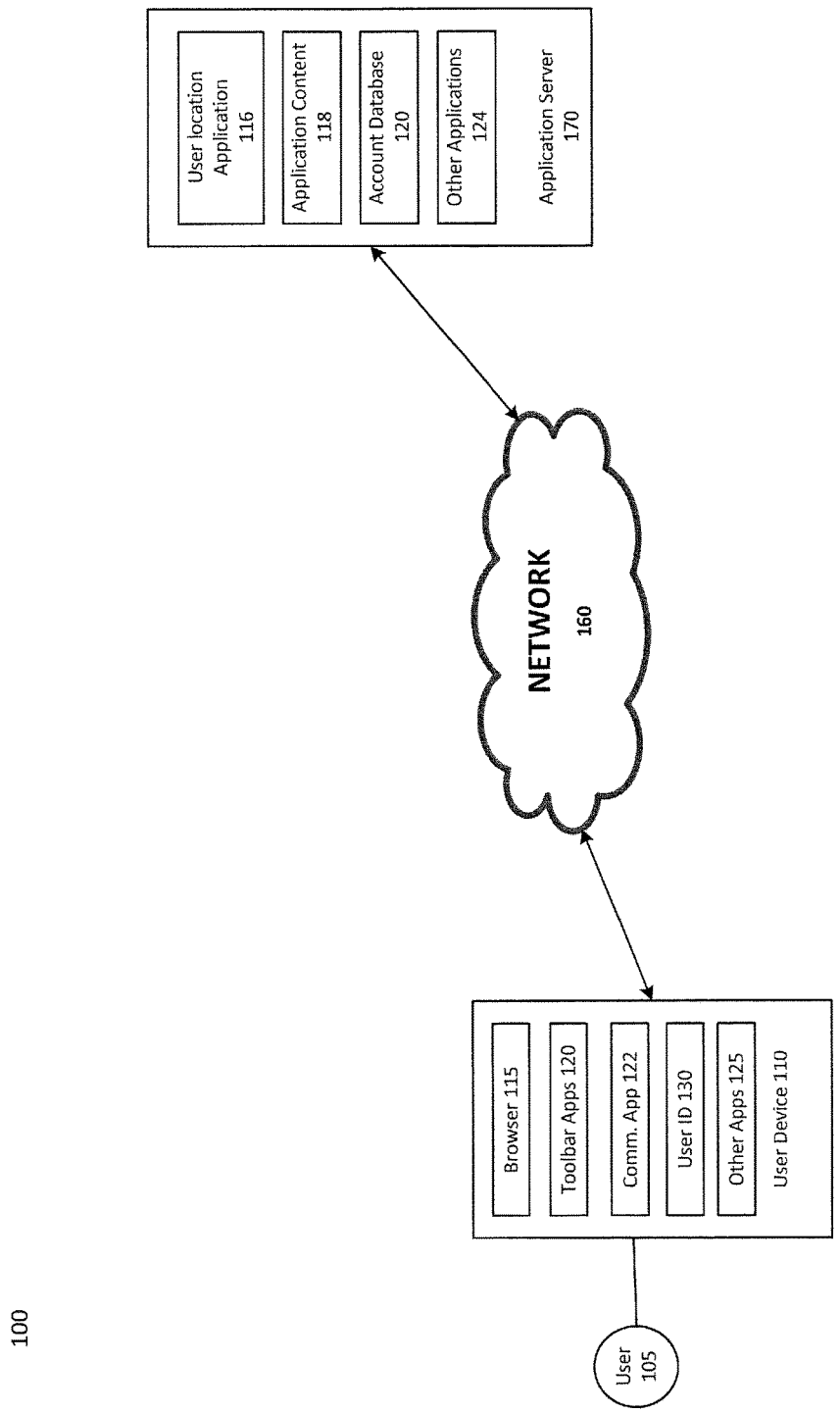
FIG. 1 is block diagram of a networked system suitable for implementing location-based application installation according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system and/or method may be provided to install applications based on location. In particular, a location of a user device may be detected. Based on the location of the user device, one or more applications may be selected to be installed automatically on the user device. Further, when the user device departs from the location, the application may automatically be uninstalled. Thus, applications may be installed and/or uninstalled on the user device based on the location of the user device.

In an embodiment, the location of the user device may be detected by a Global Positioning System (GPS). In another embodiment, the location of the user device may be determined by beacon signals received by the user device. For example, a location may be installed with a beacon device configured to broadcast a wireless signal, such as a WiFi signal, a Bluetooth Low Energy (BLE) signal, or any other radio signal, indicating the location. Thus, when the user device receives the broadcast wireless signal, the location of the user device may be determined. Particular locations may serve as triggers for automatic installation for particular applications.

The automatically installed application may provide functionality or information associated with the location that triggered the installation. For example, a location of a merchant's store may be associated with a merchant's application which may be installed automatically on devices of customers who enter the merchant's store. The merchant's application may provide information about the store to the customers and/or help customers shop or navigate the merchant's store. When the customer departs from the merchant's store, the merchant's application may automatically be uninstalled from the mobile device of the customer. Thus, the mobile device of the customer is not inundated with excess amount of applications.

In an embodiment, the applications that are designated for automatic installation required additional screening or security check. For example, application stores or application platform may require that developers of application that utilize the automatic installation feature fulfill additional security and/or quality requirements before the application are qualified to utilize the automatic installation feature. As such, spam wares or other illegitimate applications are prevented from using the automatic installation feature to pester users with unwanted advertisements. In some embodiments, applications that utilize the automatic installation feature have restricted functionality or limited access to certain portions of the user device. For example, applications that utilize the automatic installation feature may be restricted from accessing user's contact list, calendar or other private information without the user's express permission. These applications also may be restricted from altering or deleting data from the user device.

In an embodiment, the installation data file for the application may be preloaded before the user device reaches a triggering location. Thus, when the user device reaches the triggering location, the installation data file is readily available to be executed for installing the application. In some embodiments, the installation data file may be downloaded from an application store or from a merchant when the user device reaches the triggering location. Locations that trigger application installation may include various locations, such as Point-Of-Sale of merchants, public event venues, theaters, shopping area, restaurants, schools, offices, tourist attraction, locations of public transportation, transportation vehicles, parks, or any location that user may need information or service.

FIG. 1 is a block diagram of a networked system 100 configured to implement a process for location based application installation in accordance with an embodiment of the invention. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110 and an application server 170 in communication over a network 160. Application server 170 may be maintained by a merchant or a software company that develops and/or offers various applications for consumer electronic devices. A user 105, such as a consumer, may utilize user device 110 to download and install applications offered at the application server 170. For example, user 105 may utilize user device 110 to visit a web site provided by the application server 170 to browse for applications or software contents offered at the application server 170. Although only one application server is shown, a plurality of application servers may be utilized.

User device 110 and application server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, wearable device, laptop computer, and/or other types of computing devices capable of transmitting and/or receiving data, such as an iPad™ or an iPhone™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, or make transactions.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used to associate user 105 with a particular application account at the application server 170.

A communications application 122, with associated interfaces, enables user device 110 to communicate within system 100.

User device 110 may include applications for collecting location data, such as geo-location data via Global Positioning System (GPS), temperature data, altitude data, humidity data, data regarding device movement, ambient sound data, imaging data via a camera, and etc. Further, geo-fencing or wireless beacon technology may be used to define a location. User device 110 may detect signals from devices that implement geo-fencing or wireless beacon technology. These environmental data may be utilized to determine a location or environment in which user device 110 is located.

Application server 170 may be maintained, for example, by a merchant or a software company which may provide applications or software contents that may be installed at consumer's computing devices to provide functionalities at the computing devices. Application server 170 may include a user location application 116 that may determine a location of user 105 to provide specific content to user 105. In some embodiments, user location application 116 may be able to determine a location of user device 110, which may be indicative of a location of user 105 carrying the user device 110, and when the determined location of user device 110 is the same or near a designated location associated with an application, the associated application may be downloaded and/or installed at the user device 110. Application server 170 may include application content 118 including installation data files of various applications. The installation data files may include files and/or directories of files that are downloadable by users for installing various applications on user devices. In an embodiment, application content 118 may also be time-specific content, such that the content may change based on the time of day, day of the week, month, season, and the like. As such, based on different time or date, different application content may be provided to the user. Application content 118 may also include applications that provide the functionality to browse and purchase merchant items over network 160 to provide a digital storefront for a merchant. Application server 170 may also include an account database 120 that includes account information for users having an account on application server 170, such as user 105. Account information in account database 120 may also include account information of merchants or organizations that develop applications that are downloadable from the application server 170. Application server 170 may include other applications 124 providing other functionalities.

Application server 170 may collect and store installation files of various applications that may be downloaded by users. Some of the applications may include a location-based installation feature. An application that includes the location-based installation feature may include information of one or more triggering locations that may trigger the automatic installation of the application. For example, the one or more triggering locations may be defined as a GPS coordinate and/or with a distance from the GPS coordinate. Thus, when a device carrying the installation file of the application is within the distance from the GPS coordinate, the installation file may be executed by the device to install the application automatically on the device. In another example, the one or more triggering locations may be defined by an instruction associated with a wireless signal. Thus, when a device carrying the installation file of the application detects the wireless signal carrying the instruction, the installation file may be executed by the device to install the application automatically on the device.

Applications that have the location-based installation feature may be pre-screened to have a higher security or quality standard. Because these applications may be installed automatically to user's devices, the applications may have certain security restrictions. For example, these applications may not access user's private information, such as user's contact list, calendar, and other private information, without user's express permission. These applications also may go through a quality screening to ensure that the applications provide legitimate functions or information related to the triggering location. Thus, applications that merely spam users with unwanted advertisements may be excluded from having the location-based installation feature.

Application server 170 may include a database that keeps track of applications that have the location-based installation feature and their respective triggering locations that trigger the automatic installation. Each triggering location may have one or more associated applications that may be triggered for installation. Certain applications may have exclusive triggering locations where only the certain application is triggered. Owners or developers of applications may pay a premium to have exclusivity to certain triggering locations. In an embodiment, when a triggering location is associated with multiple applications, a user may choose to install one or more of the multiple applications. An owner or a developer of an application may pay a premium to have their application listed at the front of the list of applications to be selected by the user.

Figure 2:
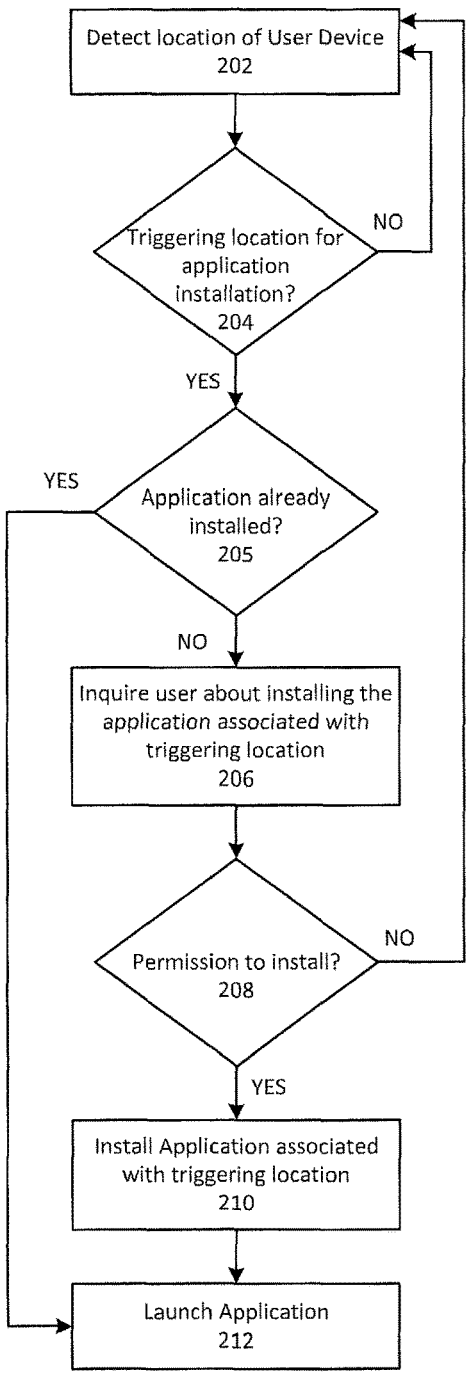
FIG. 2 is a flowchart showing a process for installing an application based on location according to one embodiment.

FIG. 2 is a flowchart showing a process 200 for installing an application based on location according to one embodiment. The process 200 may be executed at user device 110, at application server 170, or a combination of user device 110 and application server 170. At step 202, the location of user device 110 may be detected. For example, user device 110 may include a GPS sensor configured to detect the location and movement of user device 110 by tracking the GPS coordinate of user device 110. In another example, user device 110 may include a wireless signal receiver configured to detect wireless signals broadcasted from wireless beacons, such as WiFi beacons or BLE beacons, located near user device 110. The wireless signals broadcasted from the wireless beacons may indicate that user device 110 is at or near certain triggering locations, such as a merchant's store, a restaurant, a public venue, or the like.

The detected GPS coordinate or the detected wireless signals at the user device 110 may be used to determine the location of the user device 110. In an embodiment, the user device 110 may analyze the signals to determine the location of user device 110. In another embodiment, the user device 110 may send information regarding the signals to application server 170 and the user location application 116 at the application server 170 may analyze the information to determine the location of user device 110.

At step 204, based on the location of user device 110, user device 110 or application server 170 may determine whether there is an application associated with the location. For example, one or more applications that have the location-based installation feature may be pre-loaded to the user device 110. Each of the applications that have the location-based installation feature may have triggering locations that trigger installation of the applications. The user device 110 may keep track of these triggering locations and may monitor whether the user device is at or near these triggering locations.

In another example, the user device 110 may receive wireless signals from various wireless beacons. The wireless beacons may broadcast wireless signals that indicate a location and instructions for installing one or more applications. The user device 110 may receive the wireless signals and may determine whether the wireless signals include instructions for installing certain applications. In still another example, the user device 110 may provide information regarding the detected location or the received wireless signal to the application server 170. The application server 170 may then determine whether the location or the wireless signal is associated with an application that is to be automatically installed.

For example, the application server 170 may keep a database of applications that have the location-based installation feature and their respective triggering location or triggering wireless signal or instructions. Each of the applications that have the location-based installation feature may have a unique identification (ID). The wireless signals broadcasted by the wireless beacons may include the unique ID of the application that is to be triggered for installation. The application server 170 may search the database to determine whether the location of the user device 110 or the unique ID included in the wireless signals received from the user device 110 matches any triggering locations or unique ID associated with an application that has the location-based installation feature.

If the location is not associated with any applications at step 204, the process may return to step 202 to continue detecting the movement and/or location of user device 110. If the location is associated with an application at step 204, the user device 110 or the application serve 170 may determine whether the application associated with the triggering location already has been installed at step 205. For example, the application registry of the user device 110 may be checked to see if the associated application has been installed. If the associated application already is installed at the user device 110, the process may proceed to step 212, at which the associated application is automatically launched. For example, the executable program file of the associated application may be activated and the processor of the user device 110 may begin to process and/or execute the program of the associated application. In an embodiment, the user device 110 may ask the user 105 whether the associated application should be launched. When the user 105 gives permission, the applicant then may be launched.

If the associated application is not already installed at step 205, the user device 110 or the application server 170 may inquire the user 105 whether the application should be installed on user device 110. The triggering location may be associated with one or more applications. Thus, the inquiry may present a list of applications that are associated with the triggering location. The list may include the name of the application, the owner/developer of the application, description of the application including purpose, functions, file size, user ratings, and the like. Thus, the user may select the appropriate applications to install.

The user device 110 or the application server 170 may have an application that manages applications that have the location based installation feature. The user 105 may be allowed to customize various settings related to the location based installation feature. In particular, the user 105 may turn off the inquiry step 206, such that location-based installations are executed automatically without asking the user 105 by skipping step 206. User 105 also may select certain types of applications that may be installed automatically without asking the user 105 and certain types of applications that require the user's approval before installation. For example, based on user's preferences, the user 105 may allow applications related to location direction or navigation to be installed automatically without user's permission while requiring applications related to shopping to obtain the user's permission first before installation. Application server 170 may set certain applications that are mandatory to be installed regardless of the user's preferences. These mandatory applications may be related to security warning or safety notification that the user 105 must receive regardless of user's preferences.

In an embodiment, a triggering location may be associated with multiple application each is designated for a different time of a day, different days of a week, or different months or seasons of a year. For example, for the same stadium, different days may be associated with different entertainment or sporting event. Thus, based on the different time, day, month, season, or year, an appropriate application may be selected and installed for the triggering location.

In an embodiment, the user device 110 or the application server 170 may monitor the location of the movement of the user device 110 after the user device 110 reaches a triggering location that triggers the installation of an application. The user device 110 or the application server 170 may wait and see if the user device 110 remains in the triggering location for more than a predetermined amount of time, e.g., 5 minutes. After the user device 110 has been in the triggering location for more than the predetermined amount of time, the user device 110 or the application server 170 may then automatically install the application or ask the user 105's permission to install the application. This may ensure that the user 105 is staying in the triggering location to be able to utilize the location-based application, rather than merely passing through the triggering location.

At step 208, the user device 110 or the application server 170 may determine whether the application is permitted to be installed. If the application is not allowed to be installed at step 208, the process may return to step 202 to continue detecting the movement and/or location of user device 110. In an embodiment, if the user 105 declines the installation of a certain application, the certain application may be flagged for a predetermined amount of time within which the user is not inquired again about installing the certain application. Thus, the user 105 is not continuously bombarded with inquiries for installing the same application which the user 105 previously has declined.

If the application is allowed to be installed at step 208, the user device 110 may install the application associated with the location at step 210. In particular, the user device 110 may copy and/or generate program codes from the installation file of the application and store them at appropriate memory locations of the user device 110. The application also may be added to the application registry at the user device 110. Thus, the application may be ready to be executed by the user 105 at the user device 110. For example, the user device 110 may have an application installer that may unpack and/or decrypt the installation file of the application and may set up the application ready to be executed by the user device 110. If the application is allowed to be installed, the application may be flagged. Thus, the next time the user device 110 enters the same triggering location, the application may automatically be installed without user's express permission, because the user previously has given permission for this application.

In an embodiment, the installation files of the application may be pre-loaded to the user device 110. For example, the installation files may be downloaded in the background while the user device 110 is approaching the triggering location. When the user device 110 is at or near the trigger location of the application, the installation files already have been loaded and ready to be executed to install the application at the user device 110. In another embodiment, the installation files of the application are stored at application server 170. When the user device 110 is at or near the trigger location of the application, the user device 110 may download the installation files from the application server 170 and then execute the installation files to install the application at the user device 110.

After the application is installed, the application may automatically be launched at step 212 to provide service and/or information to the user 105. The application associated with the triggering location may provide various functionality and/or information related to the triggering location. For example, a merchant may have a shopping application which may be automatically installed on mobile devices of users who are visiting the merchant. The shopping application may provide users with suggestions, directions, and/or information to help users navigate and shop at the merchant's store. In another example, an operator of a public venue, such as a stadium, a park, a shopping mall, a theater, a concert hall, an amusement park, a tourist attraction, a museum, a building complex, a campus, or any other public venues, may have an application which may be automatically installed on mobile devices of customers or visitors who are visiting the public venue to provide information to help navigate them around the public venue, e.g., audio tour, or to help them find various amenities in the public venues. Other places, such as restaurants, daycare, or stores also may have applications that are installed automatically on the mobile devices of customers or users to facilitate payments or other transactions.

The applications that are installed based on location may have additional restrictions. For example, the applications may not have access to the user 105's private information, such as contact list or calendar. The applications also may not make substantive changes to the user device 110. In an embodiment, the applications that are installed automatically without the user's permission have more restriction than the applications that are installed after receiving the user's permission. For example, the applications that are installed after the user's permission may have the same level of restriction as those that are not installed based on location.

Accordingly, various location-based applications may be automatically suggested and/or installed on the user 105's user device 110 when the user device 110 is located at certain triggering location. The user 105 no longer needs to spend time and effort to search or find applications. These applications may provide appropriate functions and information to the user device 110 and may no longer be underutilized.

Figure 3:
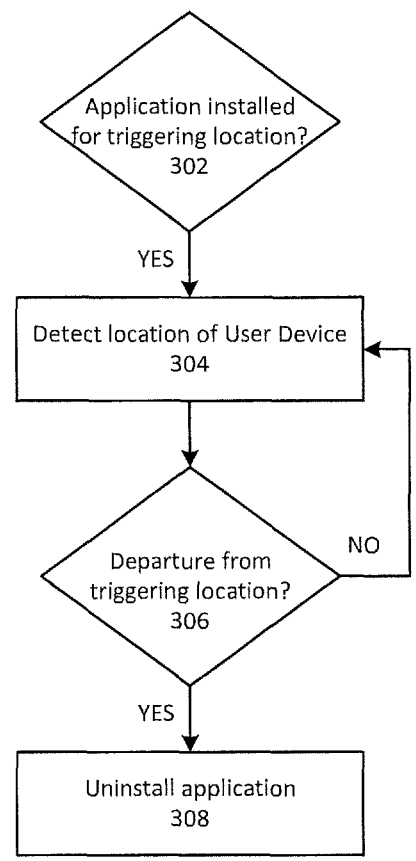
FIG. 3 is a flowchart showing a process for uninstalling an application based on location according to one embodiment.

FIG. 3 is a flowchart showing a process 300 for uninstalling an application based on location according to one embodiment. The process 300 may be executed at user device 110, at application server 170, or a combination of user device 110 and application server 170. At step 302, the user device 110 or the application server 170 may determine whether any location-based applications are installed at the user device 110. For example, the user device 110 or the application server 170 may keep track of one or more location-based applications that are currently installed at the user device 110.

At step 304, the user device 110 may detect the location of the user device 110. As noted above in step 202, the user device 110 may detect the location of the user device 110 based on a GPS sensor. The user device 110 also may detect the location based on wireless signals received from nearby wireless beacons. At step 306, the user device 110 or the application server 170 may determine whether the user device 110 still remains in the triggering location. For example, the user device 110 or the application server 170 may determine whether the current location of the user device 110 is still within the triggering location for the application. In another example, the user device 110 or the application server 170 may determine whether the user device 110 still is receiving wireless signals broadcasted from the wireless beacons for installing the application.

If the user device 110 or the application server 170 determines that the user device 110 still remains in the triggering location at step 306, the process may return to step 304 in which the location and/or movement of the user device 110 may continue to be monitored. If the user device 110 or the application server 170 determines that the user device 110 has departed from the triggering location, the user device 110 may uninstall the application previously installed for the triggering location at step 308. For example, the user device 110 may run the installer application again to uninstall the application. Programs or executable files associated with the application may be deleted from respective memory locations of the user device 110. The application also may be removed from the program registry at the user device 110. In an embodiment, the installation file for the application may remain undeleted at the user device 110. As such, the installation file may be used to install the application again later when the user device 110 enters the triggering location again.

In an embodiment, after the user device 110 departs from the triggering location, the user device 110 may wait for a predetermine amount of time, e.g., 10 minutes, before uninstalling the application. This may ensure that the user device 110 has departed from the triggering location for real before the application is uninstalled. In an embodiment, the user device 110 may uninstall the application after the user device 110 has departed a predetermined distance, e.g., 200 yards, from the triggering location.

In an embodiment, if the user device 110 has departed from the triggering location but the user 105 still continues to use the application, the user device 110 or the application server 170 may ask the user 105 whether the user 105 wishes to keep the application. If the user 105 confirms that the application is to be kept, the user device 110 may leave the application installed.

Accordingly, the application may be uninstalled from the user device 110, when the user device 110 departs from the triggering location. Because the location-based application is removed from the user device 110, the user 105 is not inundated with too many applications installed on the user device 110.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile system, comprising:
   a non-transitory memory; and
   one or more hardware processors coupled to the non-transitory memory and configured to read instructions from the non-transitory memory to cause the mobile system to perform operations comprising:
      determining a location of the mobile system;
      identifying, from a plurality of mobile applications not installed in the mobile system, a first mobile application configured to perform a function associated with a first location corresponding to the determined location;
      determining that the first mobile application is installable on the mobile system without a user authorization;
      in response to determining that the first mobile application is installable on the mobile system without the user authorization, automatically installing the first mobile application on the mobile system;
      determining a level of access to data stored on the mobile system for the first mobile application; and
      restricting the first mobile application from accessing a portion of the data based at least on the determined level of access.

2. The mobile system of claim 1, wherein the function associated with the first location comprises a function to receive one or more wireless signals from the detected location.

3. The mobile system of claim 1, wherein the operations further comprise:
   determining one or more settings of the mobile system that enables the mobile system to install the first mobile application without the user authorization,
   wherein the first mobile application is installed based at least on the one or more determined settings.

4. The mobile system of claim 1, wherein the operations further comprise:
   determining that the mobile system is outside a geofence of the first location for at least a predetermined period of time; and
   in response to determining that the mobile system is outside the geofence of the first location for at least the predetermined period of time, automatically uninstalling the first mobile application.

5. The mobile system of claim 1, wherein the operations further comprise:
   determining that a pre-determined period of time has passed since the first mobile application was installed; and
   in response to determining that the pre-determined period of time has passed since the first mobile application was installed, automatically uninstalling the first mobile application.

6. The mobile system of claim 1, wherein the operations further comprise:
   determining, prior to installing the first application, that the mobile system is moving toward the first location; and
   pre-loading the first application onto the mobile system before the mobile system reaches the first location.

7. A non-transitory machine-readable medium having stored thereon machine-readable instructions executable to cause a mobile device to perform operations comprising:
   determining a location of the mobile device;
   identifying, from a plurality of mobile applications not installed on the mobile device, a first mobile application configured to perform a function associated with a first location corresponding to the determined location;
   determining the first mobile application corresponds to one of a set of preauthorized mobile applications that is installable on the mobile device without a user authorization;
   in response to determining that the first mobile application corresponds to the one of the set of preauthorized mobile applications, determining a setting of the mobile device that configures the mobile device to install the first mobile application on the mobile device without the user authorization; and
   automatically installing the first mobile application on the mobile device based at least on the determined setting of the mobile device.

8. The non-transitory machine-readable medium of claim 7, wherein the function associated with the first location comprises a function to receive one or more merchant offers from one or more devices at the first location.

9. The non-transitory machine-readable medium of claim 7, wherein determining the first mobile application corresponds to the set of preauthorized mobile applications is based on the function the first mobile application is configured to perform.

10. The non-transitory machine-readable medium of claim 7, wherein the operations further comprise:
    determining that the mobile device is outside a geofence of the first location for at least a predetermined period of time; and
    in response to determining that the mobile system is outside the geofence of the first location for at least the predetermined period of time, automatically uninstalling the first mobile application.

11. The non-transitory machine-readable medium of claim 7, wherein the operations further comprise:
    determining that a predetermined period of time has passed since the first mobile application was installed; and in response to determining that the pre-determined period of time has passed since the first mobile application was installed, automatically uninstalling the mobile application.

12. The non-transitory machine-readable medium of claim 7, wherein the operations further comprise:
determining, for the first mobile application, a level of access to stored data on the mobile device; and
restricting the first mobile application from accessing a portion of the data stored on the mobile device based at least on the determined level of access.

13. The non-transitory machine-readable medium of claim 12, wherein the portion of data corresponds to a calendar application of the mobile device.

14. The non-transitory machine-readable medium of claim 7, wherein the operations further comprise:
determining, prior to installing the first application, that the mobile system is moving toward the first location; and
pre-loading the first application onto the mobile system before the mobile system reaches the first location.

15. A method, comprising:
determining, by one or more hardware processors, a location of a mobile device;
identifying, by the one or more hardware processors from a plurality of mobile applications not installed on the mobile device, a first mobile application configured to perform a function associated with a first location corresponding to the determined location;
determining that the mobile device is configured to install the first mobile application on the mobile device without a user authorization based at least on the determined location of the mobile device;
in response to determining that the mobile device is configured to install the first mobile application on the mobile device without the user authorization, automatically installing the mobile application on the mobile device;
determining a predetermined period of time has passed since the first mobile application was installed; and
in response to determining the pre-determined period of time has passed since the first mobile application was installed, automatically uninstalling the first mobile application.

16. The method of claim 15, wherein the function associated with the first location comprises a function to receive one or more merchant offers from one or more merchant devices at the first location.

17. The method of claim 15, further comprising:
determining one or more settings of the mobile device that enables the mobile device to install the first mobile application on the mobile device without the user authorization,
wherein the mobile application is installed based at least on the one or more determined settings.

18. The method of claim 15, further comprising:
determining, prior to installing the first application, that the mobile system is moving toward the first location; and
pre-loading the first application onto the mobile system before the mobile system reaches the first location.

19. The method of claim 15, further comprising:
determining, for the first mobile application, a level of access to stored data on the mobile device; and
restricting the first mobile application from accessing a portion of the data stored on the mobile device based at least on the determined level of access.

20. The method of claim 19, wherein the portion of the data comprises a contact list.

* * * * *